3,107,172
MOLDED PRODUCT CONTAINING POLY-β-HY-DROXYBUTYRIC ACID AND METHOD OF MAKING
James N. Baptist, Laurel, and Frank X. Werber, Rockville, Md., assignors to W. R. Grace & Co., New York, N.Y., a corporation of Connecticut
No Drawing. Filed Dec. 30, 1960, Ser. No. 79,487
6 Claims. (Cl. 106—160)

This invention relates to a moldable composition containing poly-β-hydroxybutyric acid, a polymer consisting of repeating units of the formula

It comprises the process for the manufacture of the molded product and the new product itself.

Broadly speaking, the invention is directed to subjecting dried bacterial cells containing 40 to 95% poly-β-hydroxybutyric acid to a shaping operation under pressure and at a temperature of 350 to 390° F.

Poly-β-hydroxybutyric acid is known to occur in the Athiorhodaceae, Pseudomonadaceae, Spirillaceae, Rhizobiaceae, Bacillaceae and Azotobacteriaceae families. In my copending application Serial No. 58,154, filed September 26, 1960, now Patent No. 3,036,959, I described a method for isolating this polyester by extraction with pyridine. The poly-β-hydroxybutyric acid extracted by the aforementioned method is a translucent, plastic-like material which is easily cast into a film or molded into articles by conventional methods. It is also useful for surface coatings and as a fiber.

I have now found that a new and useful product is obtained when dried bacterial cells containing a large amount of this polyester, i.e. 40% and higher, are molded.

In carrying out this invention it is essential to use dried bacterial cells containing at least 40% by weight of poly-β-hydroxybutyric acid. Although this material, broadly speaking, is known to those skilled in the art, a brief description of efficient techniques for preparing it, ready for molding, will be given here. To start, quantities of the appropirate bacteria are grown under conditions which cause them to synthesize a maximum amount of polyester. The bacteria are then collected by known means, i.e. centrifugation, and the mass of wet cells is dried in a suitable manner, i.e. in air or under a vacuum. A temperature of about 210 to 230° F. is suitable when the bacterial mass is dried in an oven, and if a vacuum oven is used, a temperature of about 65 to 125° F. is suitable. Spray drying is a particularly feasible method for commercial production of this molding composition. The cells can also be dried by dispersing them in acetone. A cells:acetone weight ratio of 1:1 to 10 is suitable.

In addition to poly-β-hydroxybutyric acid, the dried cells also contain proteins and nucleic acids. Since these substances are high molecular weight polymers, they add to the toughness of the final product. As in the case of proteins used as industrial plastics, notably casein, formaldehyde can be mixed with the dried cells to modify the proteins in order to improve the water resistance of the molded product.

The dried cells are easily molded in conventional molding and extruding apparatus, at conventional molding pressures. The molding temperature, however, has been found to be fairly critical. The mold must be at a temperature of 350 to 390° F. Below 350° F. the molded product has low structural strength, whereas molding temperatures higher than 390° F. will cause the bacterial composition to degrade. The product molded in the aforesaid critical range is dark brown in color but this color can easily be modified by the addition of coloring matter before molding.

The bacterial composition can be molded into sheets and various articles of manufacture. Since poly-β-hydroxybutyric acid is a solid thermoplastic, the product of this invention can be utilized where materials of this type are ordinarily used. If a molded product with particular characteristics is desired, the bacterial composition can be mixed, before molding, with filling agents, coloring matters, softening agents, etc. Ornamental and useful products are also obtained by impregnating fibrous materials such as textile fabrics, paper and the like with the bacterial composition.

The following examples will serve to illustrate the invention:

Example I

A batch of an unidentified species of Rhizobium (B. 142, Colonial Microbiological Institute, Port of Spain, Trinidad) was grown under conditions to give about 1 gram of poly-β-hydroxybutyric acid per 2 grams of dried cells.

A nutrient medium having the following composition was first prepared:

| | | |
|---|---|---|
| Glucose | g | 40.0 |
| Mineral solution [1] | ml | 600.0 |
| Yeast extract | g | 1.0 |
| Water | ml | 1000.0 |

[1] Mineral solution: 10.0 g. $(NH_4)_2SO_4$, 10.0 g. $KH_2PO_4$, 18.9 g. $Na_2HPO_4 \cdot 7H_2O$, 2.0 g. $MgSO_4$, 0.2 g. $CaCl_2$, 0.06 g. $FeCl_3$, 1000.0 ml. $H_2O$.

The nutrient medium was autoclaved and allowed to cool. A 50 ml. inoculum of the Rhizobium from a 72-hour old culture was added to the nutrient medium. The medium was continuously aerated at room temperature for about 72 hours with filtered air at the rate of about 20 to 50 cc. per minute. Aeration was vigorous enough to mix the nutrient medium continuously. The cells were harvested by centrifugation and dried.

To determine polyester content, 2 grams of the dried cells were added to 100 ml. pyridine and refluxed for 10 minutes to dissolve the polyester. The resulting solution was filtered and 400 ml. ether were added to the filtrate to precipitate the polyester. The polyester was recovered and dried overnight in a vacuum desiccator. The yield of dry polyester was 0.8960 gram.

Example II

A batch of dried cells was prepared as in Example I. The cells were assayed as in Example I and found to contain 42% poly-β-hydroxybutyric acid.

About 5 grams of the cells were placed in the lower half of a molding cavity of a compression molding machine preheated to a temperature of 375° F. The mold was slowly closed until the material started to flow at which time the rate of closing of the mold was slowed to nearly an imperceptible speed. After the excess material had flashed out and the upper part of the mold (punch) had seated on the cut off area (lands) of the cavity, the mold was held under a pressure of about 10,000 p.s.i. for 15 seconds. The mold was then opened and a circular disk about 2 inches in diameter suitable for use as a button was easily removed.

This molded material is suitable for table ware, panel boards, bottle closures and the like.

Example III

A batch of dried cells was prepared and assayed as in Example I. These cells contained 50% polyester.

2 grams of the dried cells were placed in a compression molding machine preheated to a temperature of 350° F. The same technique for molding was followed as in Example II except in this case a sheet was molded. The resulting brown sheet was folded together and molded again for 20 seconds under the same conditions. A brown sheet with a smooth surface was produced.

In subsequent runs, using the same procedure as above, increasing the temperature above 390° F. resulted in charring the material.

*Example IV*

25 grams of dried bacterial cells, produced as described in Example I, were ground to a fine powder and spread over a previously degreased piece of canvas. Pieces of the canvas were then pressed at about 360° F., whereby strong laminated plates were obtained.

This procedure for laminating canvas can be used successfully with other fibrous materials such as textile fabrics, asbestos, paper and fiber glass.

*Example V*

A batch of dried cells was prepared as in Example I but with only 1% glucose in the medium. The cells contained 60% polyester.

About 0.2 gram of the dried cells were mixed with about 1.4 grams of the pure polyester and placed in a compression molding machine preheated to a temperature of 360° F. The mixture was subjected to a pressure of about 5000 p.s.i. for 30 seconds. A light brown, flexible sheet with a smooth surface was produced.

We claim:

1. The method of making a molded product comprising subjecting, at a temperature of 350 to 390° F. and at a pressure of at least 100 p.s.i., a molding composition consisting essentially of dried bacterial cells containing 40–95% by weight poly-$\beta$-hydroxybutyric acid.

2. The method according to claim 1 wherein the temperature of the mold is 370° F.

3. The method of manufacturing molded materials which comprises spreading a molding composition on fibrous material and subjecting the thus treated fibrous material to a temperature of about 350 to 390° F. and a pressure of at least 100 p.s.i., said molding composition consisting essentially of dried bacterial cells containing 40–95% by weight poly-$\beta$-hydroxybutyric acid.

4. The method according to claim 3 wherein the temperature of the mold is 370° F.

5. As a new article of manufacture, a molded product comprised of a molding composition consisting essentially of dried bacterial cells containing 40–95% by weight poly-$\beta$-hydroxybutyric acid.

6. As a new article of manufacture, a molded material comprised of a molding composition and a fibrous material, said molding composition consisting essentially of dried bacterial cells containing 40–95% by weight poly-$\beta$-hydroxybutyric acid.

References Cited in the file of this patent
UNITED STATES PATENTS

| | | |
|---|---|---|
| 2,026,253 | Sanborn | Dec. 31, 1935 |
| 2,811,442 | Van Horn et al. | Oct. 29, 1957 |
| 3,036,959 | Baptist | May 29, 1962 |